US012305351B2

(12) United States Patent
Connelly

(10) Patent No.: US 12,305,351 B2
(45) Date of Patent: May 20, 2025

(54) SELF-INSTALLING HAMMER DRILL SDS GROUNDING ROD

(71) Applicant: Paul Connelly, Turle Creek, PA (US)

(72) Inventor: Paul Connelly, Turle Creek, PA (US)

( * ) Notice: Subject to any disclaimer, the term of this patent is extended or adjusted under 35 U.S.C. 154(b) by 163 days.

(21) Appl. No.: 17/963,606

(22) Filed: Oct. 11, 2022

(65) Prior Publication Data

US 2024/0117584 A1 Apr. 11, 2024

(51) Int. Cl.
*H01R 4/66* (2006.01)
*E02D 5/56* (2006.01)

(52) U.S. Cl.
CPC *E02D 5/56* (2013.01); *H01R 4/66* (2013.01)

(58) Field of Classification Search
CPC .. E02D 5/56; H01R 4/66; E21B 7/027; E21B 7/20; E21B 10/445; E04H 12/20
USPC .............................................................. 174/6
See application file for complete search history.

(56) References Cited

U.S. PATENT DOCUMENTS 6,815,607 B1 * 11/2004 Gingras ................... H01R 4/66 174/6
6,916,983 B2 * 7/2005 Orsini ..................... H01R 4/66 52/165
6,963,026 B2 11/2005 Brennan
7,832,088 B2 11/2010 Stockin et al.
9,206,578 B1 12/2015 Rose
10,490,992 B1 11/2019 Robertson
10,673,152 B2 * 6/2020 O'Connell ............... H02G 1/02
2002/0018698 A1 2/2002 Lolli et al.
2003/0159544 A1 * 8/2003 Moser ....................... B23C 3/32 407/54
2016/0126645 A1 * 5/2016 Mundle .................... H01R 4/66 174/6
2023/0046295 A1 * 2/2023 Hansson ................... E02D 7/04

FOREIGN PATENT DOCUMENTS

WO 2021191399 9/2021

* cited by examiner

*Primary Examiner* — Timothy J Thompson
*Assistant Examiner* — Paramita Ghosh

(57) ABSTRACT

An article of manufacture for providing a self-installing hammer drill SDS-based grounding rod according to the present invention is disclosed. The grounding rod includes a shaft member having a top end and a lower end, an SDS-style slot about the top end for coupling within a chuck of a hammer drill, a set of flanges extending out from the shaft member about the lower end, and a case-hardened tip coupled to the lower end of the shaft member.

9 Claims, 2 Drawing Sheets

SELF-INSTALLING HAMMER DRILL SDS GROUNDING ROD

TECHNICAL FIELD

This application relates in general to an article of manufacture for providing an electrical safety device, and more specifically, to an article of manufacture providing a self-installing hammer drill Special Drill System (SD S)-based grounding rod.

BACKGROUND

Installing grounding rods are used to connect an electrical circuit to a known ground plane. The grounding rods are installed within ground material such as rocks and dirt allowing a ground connection to be coupled to the grounding rod for the electrical circuit. Grounding rods typically are installed by hammering them into the ground material. Unfortunately, many workers have been injured as the grounding rods are installed depending upon the material encountered when hammered into the ground material.

Therefore, a need exists for an article of manufacture providing a self-installing hammer drill SDS-based grounding rod. The present invention attempts to address the limitations and deficiencies in prior solutions according to the principles and example embodiments disclosed herein.

SUMMARY

In accordance with the present invention, the above and other problems are solved by providing an article of manufacture providing a self-installing hammer drill SDS-based grounding rod according to the principles and example embodiments disclosed herein.

In one embodiment, the present invention is an article of manufacture for providing a self-installing hammer drill SDS-based grounding rod. The grounding rod includes a shaft member having a top end and a lower end, an attachment device about the top end for coupling within a chuck of a hammer drill, a set of flanges extending out from the shaft member about the lower end, and a case-hardened tip coupled to the lower end of the shaft member. The grounding rod is coupled to an electric ground wire once installed into ground material.

In another aspect of the present invention, the attachment device is an SDS-style slot for coupling within the chuck of the hammer drill.

In another aspect of the present invention, the attachment device is a spline end for coupling within the chuck of the hammer drill.

In another aspect of the present invention, the set of flanges comprises a masonry drill bit.

In another aspect of the present invention, the shaft member is made of a material comprising galvanized steel and copper.

In another aspect of the present invention, the shaft member has a length comprising 6, 8, and 10 feet.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
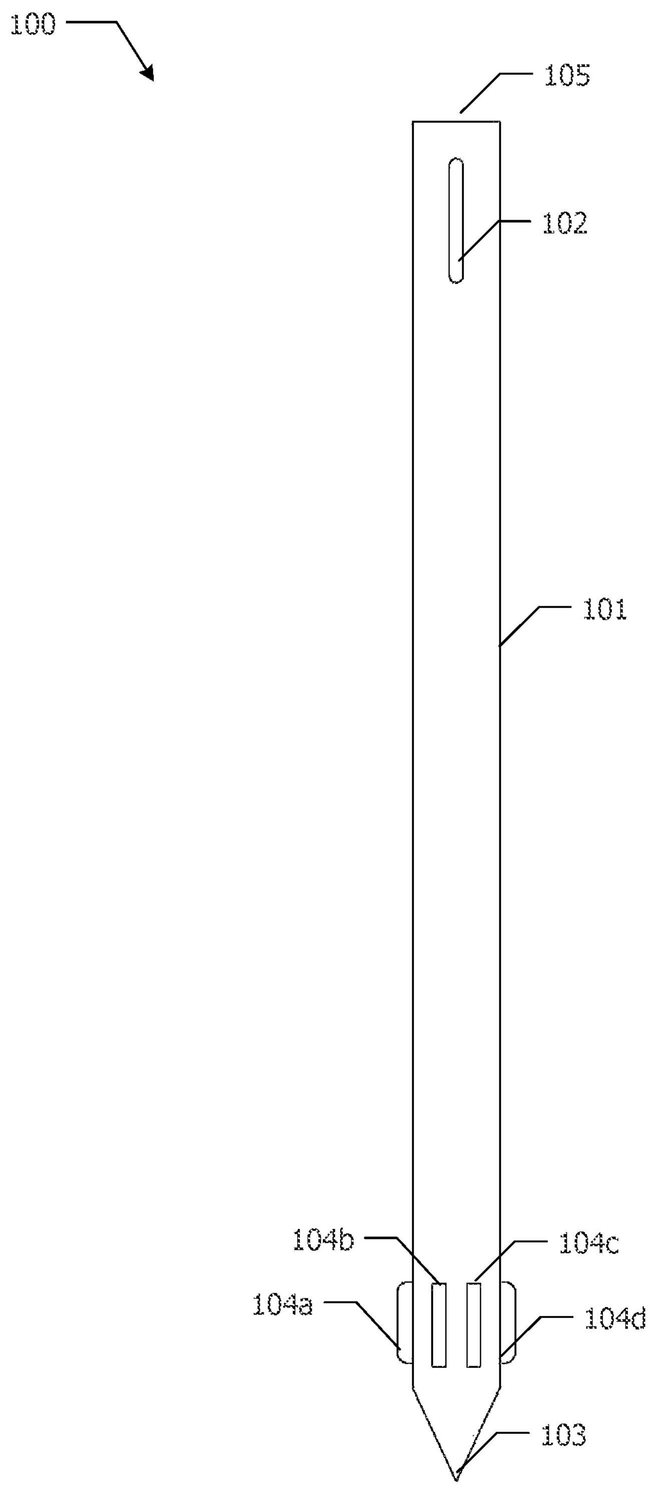
FIG. 1 illustrates an example embodiment of an article of manufacture providing a self-installing hammer drill SD S-based grounding rod according to the present invention.

This application relates in general to an article of manufacture for providing an electrical safety device, and more specifically, to an article of manufacture providing a self-installing hammer drill Special Drill System (SDS)-based grounding rod according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing a self-installing hammer drill SDS-based grounding rod according to the present invention. The term user herein refers to one or more users.

The term "invention" or "present invention" refers to the invention being applied for via the patent application with the title "Self-Installing Hammer Drill SDS Grounding Rod." The invention may be used interchangeably with a ground rod.

In general, the present disclosure relates to an article of manufacture providing a self-installing hammer drill SDS-based grounding rod according to the present invention. To better understand the present invention, FIG. 1 illustrates an example embodiment of an article of manufacture providing a self-installing hammer drill SDS-based grounding rod according to the present invention. A grounding rod 100 is shown having a shaft member 101 with a top end 105 and a lower end 103. An attachment device, such as SDS-style slot 102 is shown in FIG. 1 about the top end 105 of the shaft member 101. The attachment device is used for coupling the grounding rod 100 to a hammer drill. Alternatively, a spline end may be used in place of the SDS end to couple the grounding rod 100 to a hammer drill for use.

The shaft member 101 also comprises a set of case-hardened flanges 104*a-d* about the circumference of the lower end 103 of the shaft member 101. The set of case-hardened flanges 104*a-d* assists the grounding rod 100 in cutting through rocks and dirt of the ground material as the grounding rod 100 spins in the hammer drill. In a preferred embodiment, the case-hardened flanges 104*a-d* may comprise 2 flanges, although additional flanges may be used. The shaft member 101 is sized to fit within a ¾" drive of a hammer drill. The top of the ground rod 100 uses a slotted drive shaft (SDS) end for a bit retention system in one embodiment. Once installed into the ground material, an electrical connection may be coupled to the grounding rod 100 as needed.

Figure 2:
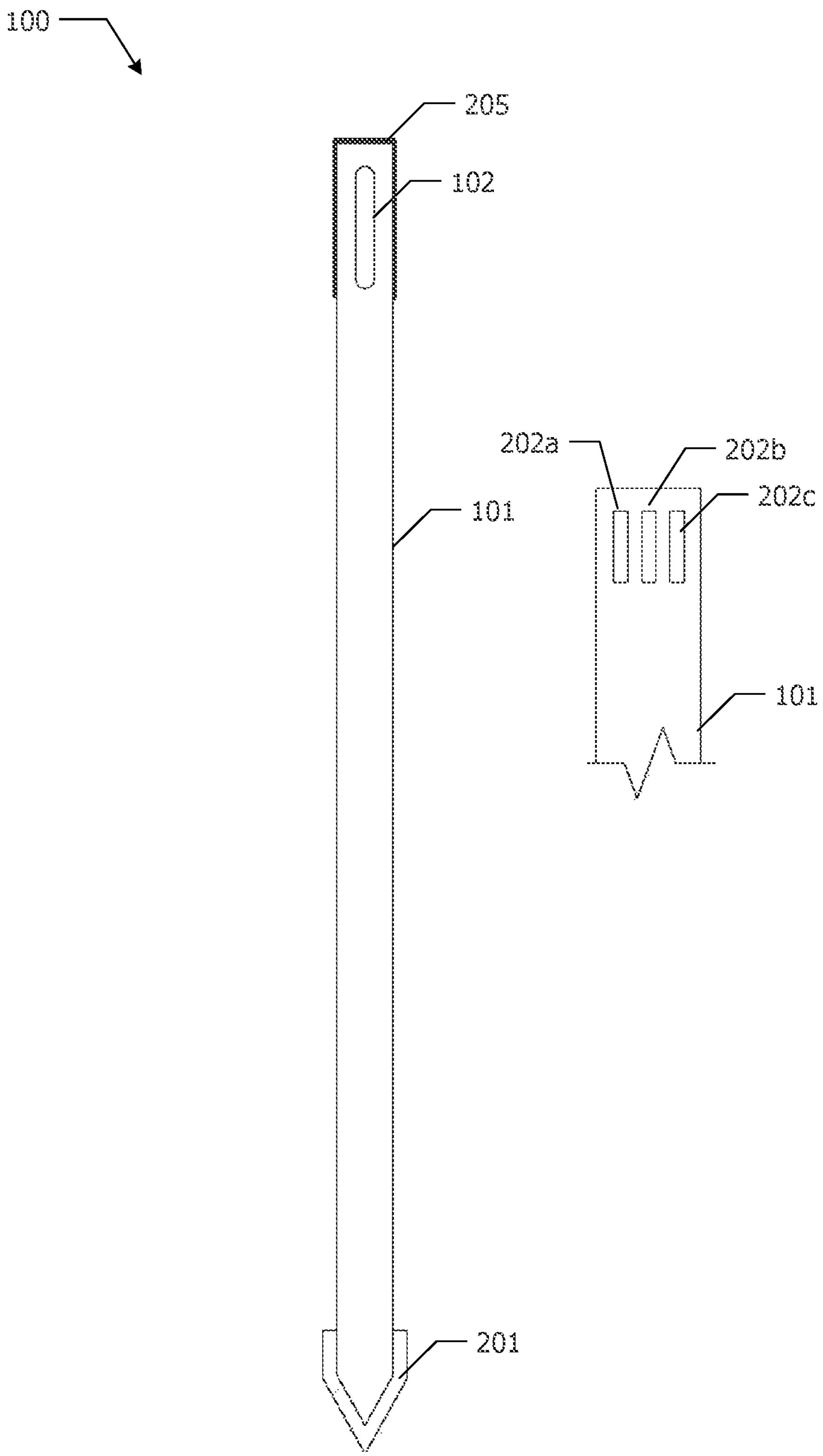
FIG. 2 illustrates an article of manufacture providing a self-installing hammer drill SDS-based grounding rod according to the present invention.

FIG. 2 illustrates an article of manufacture providing a self-installing hammer drill SDS-based grounding rod according to the present invention. In a preferred embodiment, the grounding rod 100 has an 8' long shaft member 101. A case-hardened tip 201 coupled about a lower end 103 of the shaft member 101. In the preferred embodiment, the case-hardened tip 201 has a length of ½" up the shaft member 101 and has a thickness of 1/16" out from the shaft member 101. The case-hardened tip 201 may be made of tungsten carbine in a preferred embodiment.

About a top end 105 of the shaft member 101, a pair of SDS-style slots 102 is cut into the shaft member 101 for coupling to a hammer drill SD S-style (not shown). The top end 105 of the shaft member 101 is inserted into the hammer drill SDS tool holder and coupled to its chuck.

In an alternate embodiment, an optional top head 205 may be coupled to the top end 105 of the shaft member 101. The optional top head 205 adds spline drill shank 202*a-c* about the circumference of the shaft member 101. The spline drill shank 202*a-c* couples the grounding rod 100 within a spline bit chuck (not shown).

Once secure within the chuck, the grounding rod 100 may be installed into the ground in a rotating fashion ordinarily using the SDS-style hammer drill. The case-hardened tip 201 and the corresponding case-hardened flanges 104*a-d* cut into ground material permitting the grounding rod 100 to be inserted into the rocks and dirt of the ground surface. The case-hardened flanges 104*a-d* may include masonry drill bit characteristics to aid in the insertion of the grounding rod 100 into the ground materials. For example, the grounding rod may be made from common ground rods material consisting of galvanized, copper and come in lengths of 6, 8, and 10 feet.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A grounding rod comprising:

a shaft member having a top end portion and a lower end portion;

the top end portion comprising an SDS-style shank having a groove configured to slidingly engage with a ball bearing of a chuck of a rotary hammer drill, such that the top end portion is movable in a reciprocating manner in the chuck, the groove being elongated and extending parallel to a longitudinal axis of the shaft member, the groove having straight sides and rounded closed ends being configured to retain the ball bearing in the groove and prevent removal of the top end portion of the shaft member in an axial direction out of the chuck during use of the rotary hammer drill, the groove being configured and positioned to terminate a distance from a top end face of the top end portion;

a set of flanges extending out from the shaft member about the lower end portion; and a case-hardened tip coupled to the lower end portion of the shaft member;

wherein the grounding rod is configured to be coupled to an electric ground wire once installed into ground material.

2. The grounding rod according to claim 1, wherein the set of flanges comprises a masonry drill bit.

3. The grounding rod according to claim 2, wherein the shaft member is made of a material comprising galvanized steel and copper.

4. The grounding rod according to claim 2, wherein the shaft member has a length comprising 6, 8, or 10 feet.

5. The grounding rod according to claim 1, wherein said case-hardened tip comprises tungsten carbide.

6. The grounding rod according to claim 1, wherein the shaft member is made of a material comprising galvanized steel and copper.

7. The grounding rod according to claim 1, wherein the shaft member has a length comprising 6 feet.

8. The grounding rod according to claim 1, wherein the shaft member has a length comprising 8 feet.

9. The grounding rod according to claim 1, wherein the shaft member has a length comprising 10 feet.

* * * * *